(12) United States Patent
Darcovich

(10) Patent No.: US 6,225,246 B1
(45) Date of Patent: May 1, 2001

(54) FUNCTIONALLY GRADIENT CERAMIC STRUCTURES

(75) Inventor: Ken Darcovich, Ottawa (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/297,522

(22) PCT Filed: Nov. 10, 1997

(86) PCT No.: PCT/CA97/00844

§ 371 Date: May 3, 1999

§ 102(e) Date: May 3, 1999

(87) PCT Pub. No.: WO98/21164

PCT Pub. Date: May 22, 1998

Related U.S. Application Data

(60) Provisional application No. 60/030,518, filed on Nov. 12, 1996.

(51) Int. Cl.$^7$ ..................................................... C04B 38/00
(52) U.S. Cl. .............................. 501/80; 501/84; 264/86; 264/87; 210/500.21
(58) Field of Search ........................ 264/86, 87; 501/80, 501/84; 427/419.2; 210/500.21, 510.1

(56) References Cited

U.S. PATENT DOCUMENTS 5,498,383 * 3/1996 Marple et al. ...................... 264/87

5,762,841 * 6/1998 Shimai et al. ...................... 264/86

* cited by examiner

Primary Examiner—Paul Marcantoni
(74) Attorney, Agent, or Firm—Jiwayne Anderson

(57) ABSTRACT

The invention disclosed is a self-supporting porous ceramic material, which is typically used in ceramic filters as a substrate prior to coating with a thin dense membrane layer of additional ceramic material. Conventional ceramic support structures are not necessarily designed as membrane support substrates. They are typically made with monosized particles and have a uniform cross section. The present support structure is made via a polydisperse slurry method where a functionally gradient structure is achieved by a colloidal destabilization technique. The key for achieving this structure is to colloidally unstable or metastable suspensions of a controlled and broad particle size distribution, so that segregation based on particle diameter will occur during consolidation. This produces a continuously finer mean particle diameter axial profile from one major surface to the other on the cross section of the consolidated structure. The particle size distribution control is achieved by blending different ceramic powders. In terms of volume fraction, the continuous particle size distribution of the powder used to make the suspension is preferably coarse-rich.

19 Claims, 17 Drawing Sheets

$r_u$ = 0.35 microns
Uniform $r = 0.4\, r_u$
$r = 0.6\, r_u$
$r = 1.0\, r_u$
$r = 1.2\, r_u$
$r = 1.8\, r_u$
Functionally Gradient

FUNCTIONALLY GRADIENT CERAMIC STRUCTURES

This application is a 371 of PCT/CA97/00844, filed Nov. 10, 1997 and claims benefit of Provisional application Ser. No. 60/030518, filed Nov. 12, 1996.

BACKGROUND OF THE INVENTION

The invention relates to ultra and nano filtration, and in particular to a functionality gradient self-supporting ceramic structure which can be used therefor.

FIELD OF THE INVENTION

Separation membranes require some sort of backing material to achieve the necessary mechanical integrity for performance in pressurized modules. In the case of ceramic membranes, the membrane is a thin ultra-fine layer of ceramic material which is normally fused to a coarser grained ceramic substrate, commonly referred to as a support structure. The separation layer of a ceramic membrane lacks sufficient mechanical strength to stand alone, owing to its thinness and brittleness. Typically, commercially available porous ceramics are used as a starting material for subsequent coating processes for preparing fined pored membranes.

At present, there is considerable world-wide interest in the development of ceramic membrane technology. Their feature properties are their abilities to withstand high temperatures, corrosive environments and their ability to be cleaned or de-fouled with strong chemical cleaning agents and/or steam.

Mechanical requirements for ceramic membranes demand a minimum of strength, to withstand stresses arising from thermal variations, often from ambient temperatures through 1200° C.

As with any filtration technology, objectives in membrane formation are to achieve a high product flux along with a high product selectivity. In terms of membrane microstructure, this calls for a structure with high overall porosity, small trans-membrane thickness and many very small and uniform pores at the interface between the membrane and the feed medium. Using conventional forming techniques, these desirable properties are intrinsically at odds with each other, and much research effort is put into seeking workable compromises between these requirements. Alternatively, ways to circumvent the usual relationship between overall porosity, thickness and surface pore size are also sought.

In general then, it can be said that the membrane separation layer must be very fine and defect free. Membranes coated over coarse-pored substrates must be built up to sufficient thickness to "seal" the large substrate pores and ensure a defect free finish.

DESCRIPTION OF THE PRIOR ART

At present, conventional substrate ceramics are formed from mono-disperse powders. A very fine pored substrate normally has a reduced porosity and provides increased resistance (larger trans-substrate pressure drop) to product flux.

Asymmetric structures are an attractive alternative, but at present only the specialized ultra-thin Anotec™/Alcan anodized alumina membranes have this structure [1]. Substrates which are larger and/or tubular however, can not be obtained by the anodizing method used to form such membranes.

Porous ceramics are often formed from green bodies prepared by pressure methods, usually compaction or by isostatic pressing. Tubular forms are made by wet extrusion methods. In general, solid ceramic pieces are desired which are very strong, abrasion resistant and defect free. The raw ceramic powder typically has a very uniform and narrow particle size distribution, so that a very uniform microstructure can be produced in the eventual solid ceramic. High strength is most readily obtained from compacts of uniformly fine grained powder. Often, the objective in imparting the above properties to these generic materials, do not necessarily lend themselves well to membrane making.

The desirable ceramic component (solid piece) microstructure is often somewhat opposite of what might be most useful as a membrane substrate. Here, high porosity is important, and only a minimum of strength is needed. A body fused throughout (yet still quite porous) is sufficient to prevent surface abrasion, and has enough strength to withstand module pressures of up to 500 psi (~3500 kPa). Resistance to shear and torsion are less crucial, as the membranes can be housed in much stronger permeable retainers.

It is not apparent that functionally gradient substrates have been the topic of any research to date. The relative recency of research and development for ceramic membranes is such that there have been many other more immediate problems to solve. In this regard, the concepts proposed here address a new subject area.

Very small, asymmetric ceramic membranes are available commercially from Alcan International (Anotec™) [1]. These have uniform pores (available at 0.02 to 0.2 µm), formed by the very different method of anodizing sheets of aluminum metal in an electrolyte. There do not seem to be other such anodized ceramic products available. The anodizing process is limited to forming very thin pieces, and thus is not suitable for substrate fabrication. More specifically, U.S. Pat. No. 4,687,551 discloses a thin membrane, with many isolated cylindrical pores which form a finer branch-like structure at one side. A self-supporting substrate could not be made by the anodizing method employed in this reference, as the maximum possible thickness is 100 µm. These membranes have to be fused to substrates for use in more demanding (pressure, temperature, mechanical stress) environments. Further, this structure is asymmetric in the sense that there are a number of uniform cylindrical pits etched into the one side, from which a number of smaller branch-like capillaries are formed under the anodization treatment. These smaller pores penetrate the opposite surface and produce trans-structure routes. Each pore is isolated, rather than interconnected network. This structure also has distinct layers of pore fineness; a coarse region where the etched pits were made, and a very fine layer where the anodized openings were formed. This is in contrast with a continuously gradient pore size profile.

There are numerous porous ceramic materials available that have been used as membrane supports with homogeneous microstructure. For example, Toto Ltd. (Japan) has porous ceramic tubing with a 0.5 µm pore size [2].

As noted previously, the porous ceramics used for substrates are not necessarily designed to be membrane supports. Their uniform structure gives no advantage in terms of pore size at the top surface where coatings are applied. The finer the top layer, the thinner the membrane coating layer may be to avoid defects. Additionally, a uniform structure results in a uniform flux resistance across the entire thickness, and in this regard, a uniform structure with fine pores has a high flux resistance.

Uniform porous structures are meant to be machinable to an extent, and then sintered. Normally, what is desired in a ceramic component is a high strength and density, and the porous microstructures (component pre-cursors) are designed, accordingly. In view of this, the design of microstructures for ceramic components is at cross purposes with membrane making. This point is made clearer for cases where uncoated porous ceramic are used as microfiltration (MF) filters (pore sizes above 0.05 μm) or ultrafiltration (UF) filters (pore sizes between 0.002 and 0.05 μm). In these cases, the flux resistance remains constant throughout the body, even though the separation was achieved right at the membrane-fluid feed interface.

U.S. Pat. No. 4,737,323 patent actually makes reference to a Norton Ceraflow™ tubular ceramic membrane that is used in a process to extrude liposomes. The ceramic membrane that is mentioned comprises an apparently uniform microstructure ceramic substrate that has a thin membrane on one side of it. This membrane is deposited on the surface by a sol-gel method in a series of successive layers. In this sense its structure is achieved not though a continuous functionally gradient structure, but rather a series of progressively finer discrete layers which constitute the membrane coating. The substrate itself however, is uniform in structure. Often multilayer systems require multiple sinterings, which in general, are detrimental for attaining a high porosity.

SUMMARY OF THE INVENTION

According to one aspect of the invention, a functionally gradient self-supporting porous ceramic material is provided, comprising a material having first and second major surfaces, a (controlled) substantially uniformly increasing pore size gradient extending from the first to the second major surface.

According to another embodiment of the invention, a method for the manufacture of the aforementioned material is provided, comprising
(a) preparing an aqueous metastable colloidal suspension of a suitable ceramic powder having a controlled broad particle size distribution in the range of 0.1 to 10 μm,
(b) consolidating the suspension to form a ceramic green body having a segregated particle size distribution based upon particle size, and including a distribution of fines throughout, and
(c) sintering at temperatures to fuse the ceramic material without densifying it.

DESCRIPTION OF THE PREFERRED EMBODIMENTS

The material according to the invention is a contiguous functionality gradient solid entity, or substrate. With such a substrate it is possible to apply thinner defect-free membrane coatings than could be applied to conventional uniform microstructure substrates, which requires a thicker defect free membrane coating since the top surface of the substrate is composed of larger particles, resulting in larger pores and larger overall surface roughness. The membrane coating is a ceramic membrane layer, typically having a pore size equal to or less than that of the first major surface.

Figure 1A:
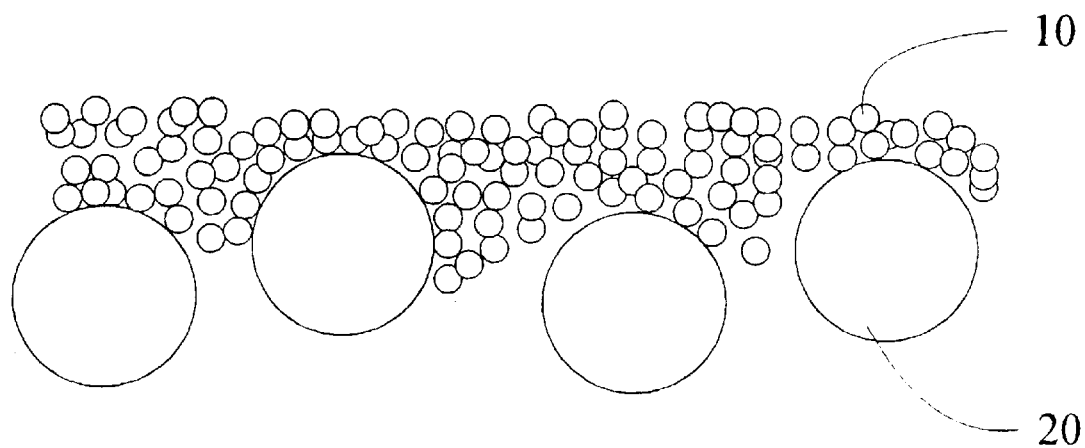
FIGS. 1A, 1B and 1C illustrate coating layer thickness dependence upon substrate top layer particle size.

FIG. 1A illustrates the need for a thick membrane coating layer 10 on a large particle size substrate top layer 20.

Figure 1B:
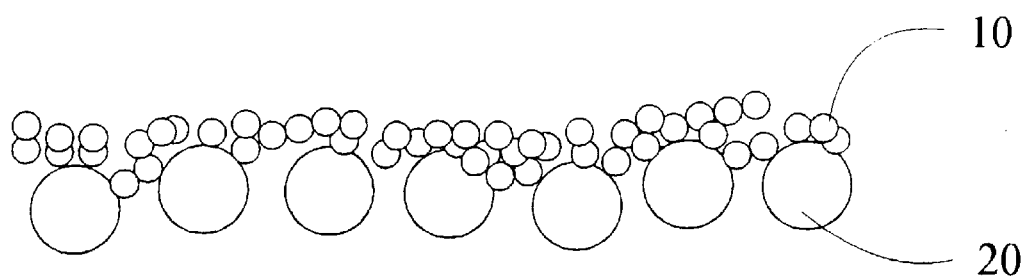
Figure 1C:
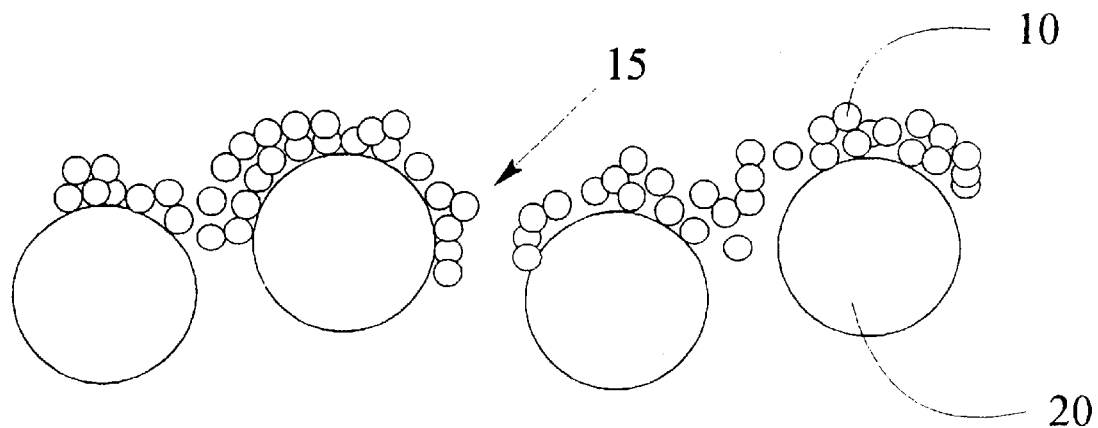

FIG. 1B illustrates that with a finer pore size at the substrate top layer 20, the coating (membrane) layer 10 can be thinner without leaving defects. A thinner coating (membrane) layer will achieve the same separation performance (based on membrane layer pore size distribution), but at a higher product rate, due to the lessened flow resistance, which is directly proportional to the membrane thickness. FIG. 1C shows that the increased surface roughness inherent with larger diameter particles at the top surface of the substrate 20 will cause gaps or defects 15 to remain if the membrane coating layer 10 is not sufficiently thick.

Figure 2:
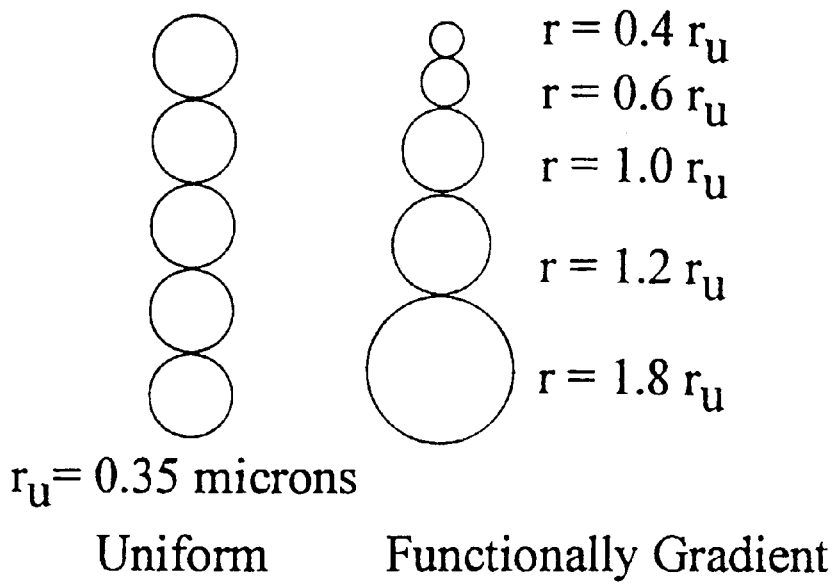
FIG. 2 is a schematic comparison of a material having uniform and functionally gradient cross-sections.

As an example, consider the two following materials shown in FIG. 2. They are both the same thickness, but the top layer of the material in the functionally gradient case has a mean particle diameter only 40% of the uniform case, yet they both have the same mean particle size. A calculation can be made to show the effect on flow resistance for both of the cases considered in FIG. 2. Using typical real dimensions, assume a substrate thickness of 3 mm ($x_s$), and a mean substrate grain size of 0.7 μm.

The mean particle radius for the uniform substrate, $r_u$ is $3.5 \times 10^{-7}$ m. The functionally gradient case can be partitioned into regions with particle radii 1.8, 1.2, 1.0, 0.6 and 0.4 times $r_u$. The pressure drop, $\Delta P$, for flow through porous media can be expressed as, $$\Delta P \alpha \sum \frac{kx_i}{r_i^2}$$

where $x_i$ is the thickness of the ith section of porous medium, $r_i$ is the particle radius in this section and k is a constant related to the solid material and liquid being used. $\Delta P$ is inversely proportional to the flow rate through a porous medium. This example has discretized the continuous distribution. Otherwise the above expression would be an integral rather than a summation for the functionally gradient case.

A key here is that the surface roughness at the top of the substrate is proportional to the particle size located there. It can be assumed that the membrane layer must be at least one substrate particle diameter in thickness to be defect-free. A typical sol-gel coating particle has a diameter of 0.01 µm, so, $r_m$ is $0.005 \times 10^{-6}$ m.

For the uniform substrate case, $$\Delta P_U = k\left(\frac{x_s}{r_\mu^2} + \frac{2r_\mu}{r_m^2}\right)$$

For the functionally gradient case, $$\Delta P_{FG} = k\left(x_s \sum \frac{f_i}{r_i^2} + \frac{2r_{TOP}}{r_m^2}\right)$$

Above, $f_i$ is the fraction thickness of substrate cross section composed of particles of size class $r_i$. These quantities are, $\Delta P_u = k(2.44 \times 10^{10} + 2.80 \times 10^{10}) = 5.24 \times 10^{10} k$ substrate+membrane=total $\Delta P_{FG} = k(3.21 \times 10^{10} + 1.12 \times 10^{10}) = 4.33 \times 10^{10} k$ It can be seen from the above calculation that when the substrate is made functionally gradient, the overall resistance to flow is reduced by more than 20%, mainly through the influence of the membrane layer. The increase in substrate flow resistance is of lesser consequence compared with the significant reduction over the membrane. Thus, the product rate, or flux, obtainable with a membrane coated onto a functionally gradient substrate can be significantly increased.

With the above calculation, three other cases are worth considering. They are summarized below:
(a) To halve the uniform case membrane thickness set, $r_u = 0.175$ µm. This gives $\Delta P_{U_{FINE}} = 11.20 \times 10^{10} k$.
(b) For a uniform cross-section, to obtain a membrane thickness the same as with the functionally gradient case, set $r_u = 0.4 \times 0.35 = 0.14$ µm. This gives $\Delta P_{U_{FINE2}} = 16.43 \times 10^{10} k$.
(c) Make a very coarse substrate for low resistance across the bulk of the structure (set $r_u = 1.8 \times 0.35 = 0.63$ µm), and apply a much thicker membrane layer. This gives $\Delta P_{U_{COARSE}} = 5.84 \times 10^{10} k$.

Aside from being treated with a coating, the substrate can at the same time have the property of a sufficiently tight-skinned top surface, suitable as-is to function as a microfiltration (pore sizes above 0.05 µm) or ultrafiltration filter (pore sizes between 0.002 and 0.05 µm). So called membranes are usually intended to effect gas separations, or ionic separations in liquid systems, and are applied as coatings to substrates.

The integral nature of the present structure allows our structures to be used as stand alone microfiltration or ultrafiltration filters. Another difference is how the porous structure results from our processing method, described below. The slight dispersion of fines throughout the microstructure, which allows localized sintering to occur without a general densification of the piece (to preserve porosity) is original. As a material, the anodized alumina simply does not have this property. Our use of a broad particle size distribution metastable colloidal slip casting method in terms of a processing method to produce functionally gradient ceramic is also original.

Finally, the cited literature does not discuss the means to fabricate, or a discrete product formed that has a continuously gradient structure. This process technique is novel and thus so are the resulting structures.

The porous nature of a structure formed by selecting a temperature and heating profile for sintering a ceramic green body consolidated from a given powder blend, a stabilizing additive with pH control, is a complex non-linear function, of all these input variables, whose optimum values were established by a screening study.

The present proposal is to slip cast ceramic membrane substrates to achieve a functionally gradient structure. The slip casting comprises preparing aqueous suspensions of a suitable porous ceramic material, e.g. alumina, and consolidating them in molds over a porous slab of fine gypsum. For example, a mold in the form of a cylindrical aluminum tube is placed standing vertically on a flat slab made from gypsum or plaster of Paris. The tube is sealed onto the plaster with an inert silastic material. A quantity of the colloidal suspension is then poured into the tube. Capillary forces draw the water from the suspension down into the plaster slab, which causes the powder in the suspension to settle and consolidate into a "green body". The colloidal stability of the suspensions is manipulated to achieve desired microstructural details in the alumina substrates. The ceramic green body obtained in this fashion is then sintered under controlled conditions to fuse the alumina grains into a continuous piece. That is, at high temperatures, ceramic particles in contact with one another will begin to fuse together. This occurs at temperatures considerably lower than their actual melting points. This process is known as sintering When a compact of powder of a "green body" is subjected to sintering conditions, the points of contact are allowed to fuse and form inter-particle neck regions. In this case, the process is not continued to the point where the neck regions expand to produce a fully solid (and filly dense) material wherein the inter-particle voids disappear. A contiguous solid structure is formed with a small amount of sintering, with the inter-particle voids being mostly retained.

A similar procedure in the literature has been shown to be effective for making uniformly structured porous supports, with a porosity of 41% and average pore diameter of 0.09 µm [3]. This substrate is less porous and is not functionally gradient.

The key for achieving this functionally gradient structure is to prepare colloidally unstable or metastable suspensions of a controlled and broad particle size distribution, so that segregation based on particle diameter will occur during consolidation. This produces a continuously decreasing mean particle diameter profile from one major surface to the other inside the consolidated structure. The particle size distribution control is achieved by making blends of different alumina powders depending upon the requirement. In terms of volume fraction, the continuous particle size distribution of the powder used to make the suspension should be coarse-rich.

Blends of powders, either by size and material (density) can give a more pronounced particle segregation. For example, comparatively finer $SiO_2$ with a density of 2.1 g/cm$^3$, blended with a coarser and denser $Al_2O_3$ (density of 3.96 g/cm$^3$) will exhibit an exaggerated tendency to segregate and consolidate at the top of a structure. In general, any parameter can be adjusted to exploit the sedimentation rates governed by Stokes law, which is:

$$v = \frac{d^2(p_s - p_f)g}{18\mu_f}$$

where, v is the sedimentation rate, d is the particle diameter, $p_s$ is the solid density, $p_f$ is the fluid density, g is the gravitational acceleration force and $\mu_f$ is the fluid viscosity.

Thus for example, using a lower fluid viscosity will enhance segregation. The parameter g could be exploited for making tubular structures inside a rotating environment, where an applied centrifugal force would augment the gravitational acceleration. The above discussion also applies to the sedimentation of clustered states [4].

The next step in membrane substrate making is sintering. A minimal amount of sintering is desired to make a continuous fused structure strong enough to withstand typical membrane module pressures (ie; 200 psi~1400 kPa), yet avoid cracking in the process. The sintering ramp and soak profiles are dependent on the size of the powder in the green body. The presence of fines allows for the structure to fuse to sufficient strength without much or any grain growth. The fines serve as local fusion sites, as they can begin the sintering process at temperatures lower than those where the coarser material is affected. A controlled distribution of fines throughout the compact can provide a source of material strength from low temperature sintering, where the consolidated green body porosity is only slightly or not affected.

The ceramic structures prepared without any coatings can be used as UF or MF membranes, with top surface pore sizes controlled within the range of 0.2 to 0.05 μm, and an asymmetric porosity ranging from 40 to 50%. Sintering profiles, as determined by the particle size distribution, are kept in the relatively low temperature range of 1000–1350° C. to minimize cracks, defects, grain growth and pore expansion.

Experimental Results and Discussion

The seven αalumina powders used in this work were Alcan C-84-LSB and C-82-LSB, Ceralox APA-0.2, APA-0.5 and HPA-1.0, and Sumitomo AKP-15 and AKP-30. These samples provided an overall particle size range from 0.06 to 70 μm.

Particle Size Distribution

Figure 3:
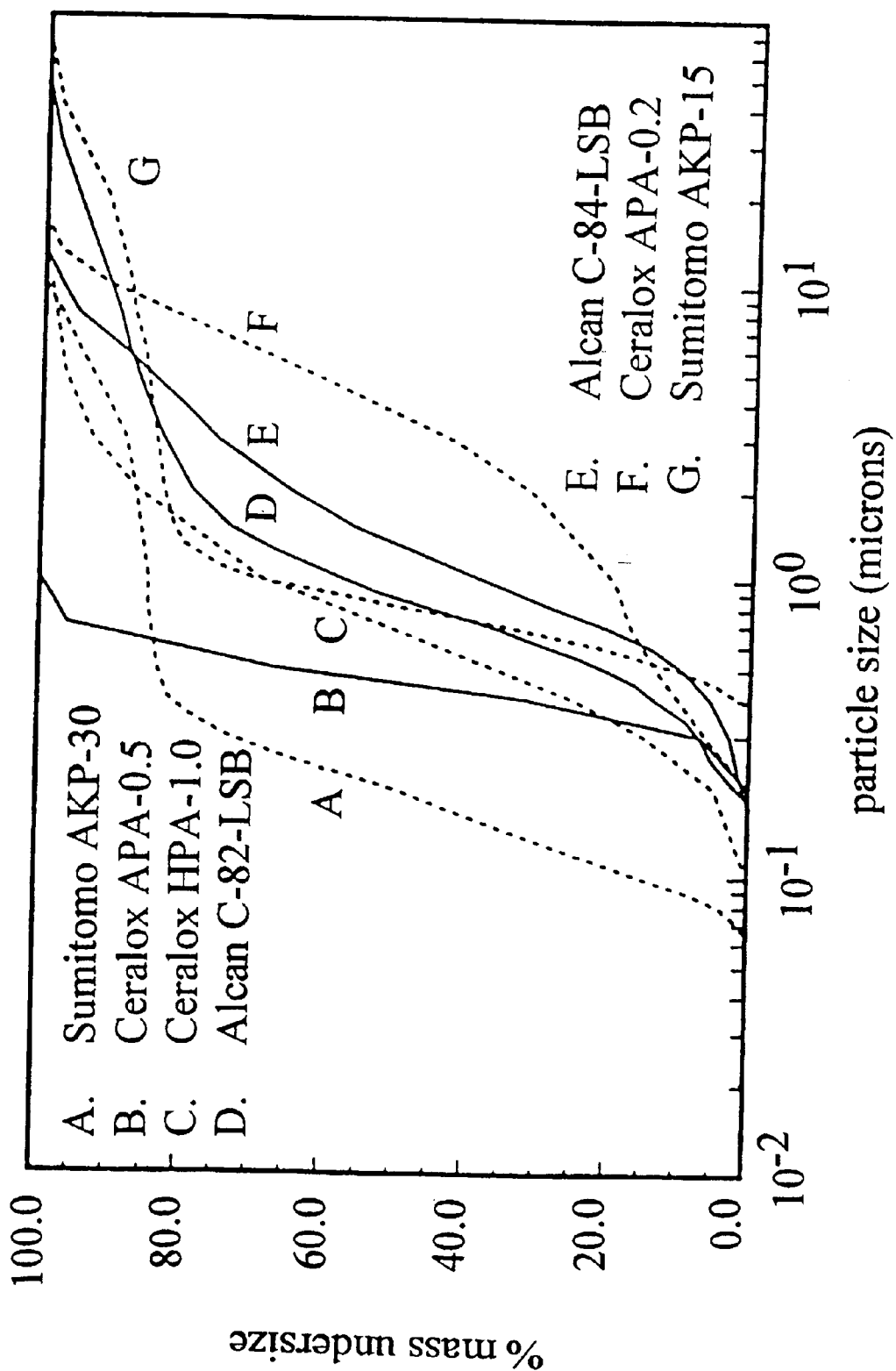
FIG. 3 is a graph illustrating cumulative mass distributions of various alumina powder samples.

The particle size distributions of the seven powders were determined using a SediGraph 5000E Particle Size Analyzer, which is an x-ray sedimentation device operating in the Stokes regime and giving a cumulative mass percent distribution in terms of spherical diameter. Stable suspensions were prepared using Sedisperse A-12 dispersing agent as the liquid phase. The cumulative particle size distributions of these powders are shown in FIG. 3.

Suspension Preparation and Characterization

Figure 4:
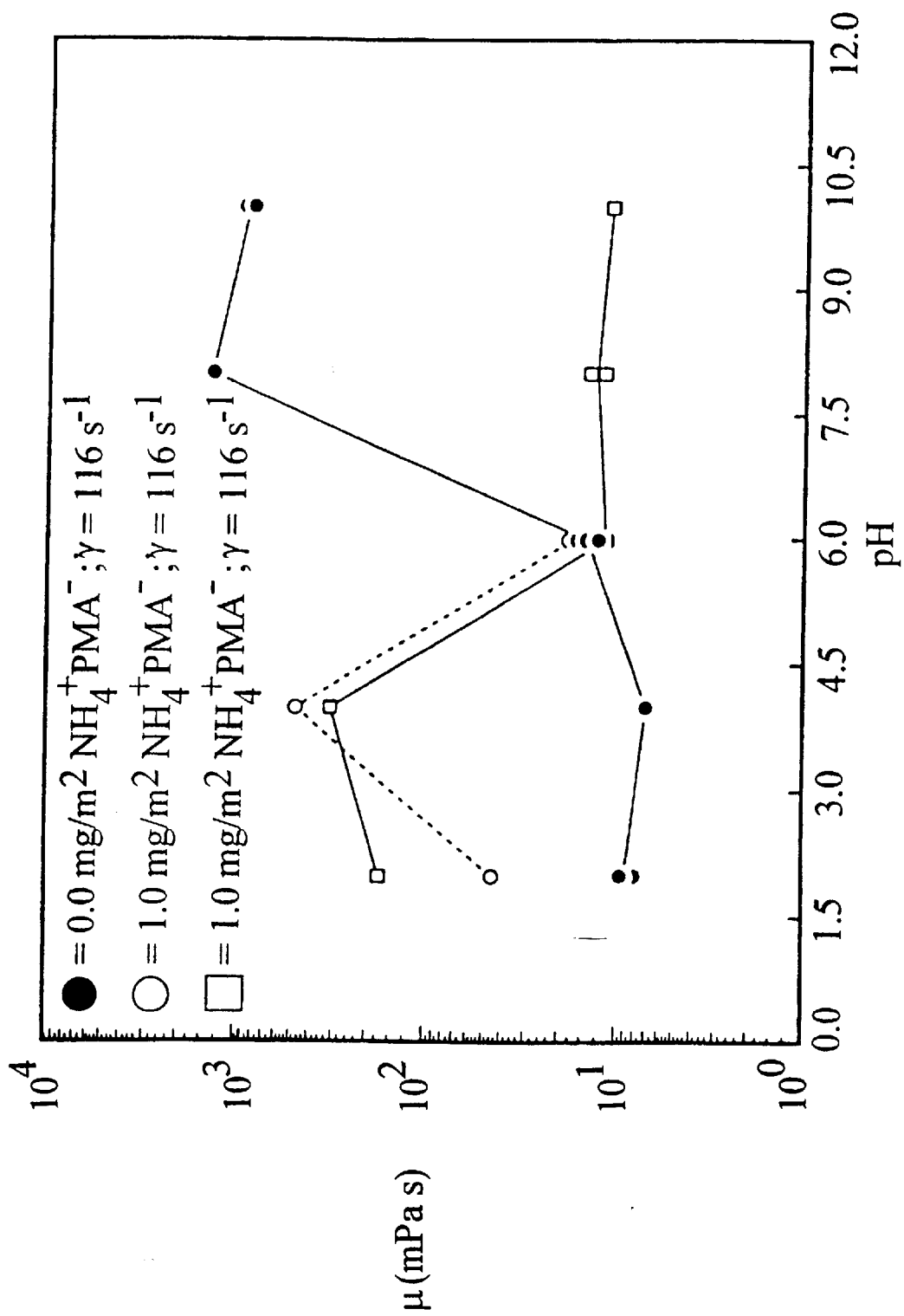
FIG. 4 is a graph of suspension viscosity versus pH with polyelectrolyte dosage as parameters for alumina powder sample AKP-15.

Alumina suspensions were prepared at solids loadings ranging from 10 to 40 v/o. The pH of these suspensions was controlled by small additions of concentrated HCl or NaOH and a steric effect was provided by the addition of an ammonium polyelectrolyte, in accordance with the stability map [3]. The extent of dispersion of a suspension of a given powder sample varies inversely with its viscosity. Viscosity measurements with VOR Bohlin rheometer were made with 30 v/o samples of AKP-15 to assess the influences of the additives. A plot of these results is given in FIG. 4.

Drain Casting and Sintering

Preliminary tests were conducted to determine the effect of the processing variables, including solids concentration, on the quality of the consolidated ceramic pieces. Suspensions from 5 to 40 v/o were drain cast over gypsum slabs to green thicknesses of about 8 mm. The 10 v/o suspensions over a variety of conditions appeared to make the most uniform and smooth consolidated disks. In all cases, it was clear that the top layer was smoother (finer grained) than the bottom layer. Depending on the grain size, sintering was performed at the lowest possible temperature (≈10 hours ramp and soak cycle, 1150 to 1400° C. maximum temperature) to achieve a slight amount of fusion to strengthen the body and immobilize the ceramic particles, while retaining as much porosity as possible.

Figure 5:
FIG. 5 is a SEM view of the top cross-section of a sintered body prepared with C-84-LSB alumina, pH 5, v/o=10 and $NH_4^+$ $PMA^-$ dosage of 2mg/m$^2$.

SEM analysis of the cross sections showed a grain-sized based asymmetry in the samples, more pronounced at pH 5, where the colloidal stability of the suspension was compromised. FIG. 5 shows how the alumina particles in a sintered body become coarser away from the top surface. A preliminary mercury porosimetry test showed a mean pore size for an asymmetric structure of 0.19 μm, at 15% porosity.

The polydispersity of the powders may bring about a situation where the fine grains sinter locally and form a strengthened structure without visible linear shrinkage in the bodies. Micro-hardness testing of the samples was done to investigate the effects of sintering on the microstructures of the ceramic disks.

It will be appreciated that although alumina and a mixture of alumina and silica have been used in our specific examples, it will be apparent to those skilled in the art that the concept of our invention is extendible to other porous ceramic materials such as zirconia, titania, yttria and the like, and mixtures thereof.

Method to Measure Hardness of Ceramic Cross-sections
sintered samples were sectioned with a diamond saw, cold mounted and polished
diamond micro-tip indenter used over cross-section of the samples
indents were measured with microscope-image analysis system
hardness, H, is calculated as:

$$H = \frac{1.8544\, M}{d^2}$$

M—mass acting on micro-lip [kg]

d—diagonal length of indent [mm]

Figure 6A:
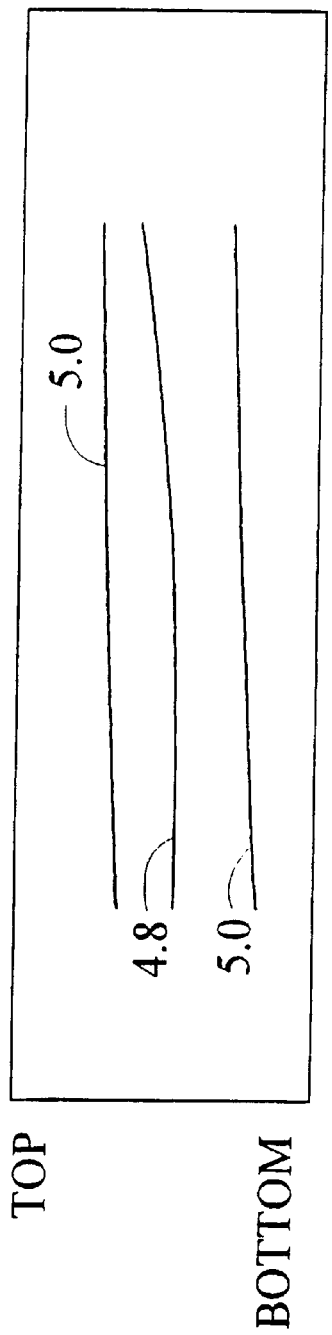
FIGS. 6A and 6B are hardness cross-sections for samples 2 and 4, respectively, of sintered bodies having uniform microstructure, made from a narrow particle size distribution powder in a colloidally stable regime.

FIGS. 6 & 7 show difference between uniform and functionally gradient (FG) samples. Broad particle size distribution (PSD) and metastable pH produce a FG structure shown by the hardness tests. Smaller particles fuse more readily under heat, so hardness profiles suggest small particles at top. FIG. 6A shows AKP15 Alumina, prepared from 10 v/o suspension with pH=2.0, maximum sintering temp= 1000° C., cross-sectional dimensions: 24.5 mm×5.4 mm.

Figure 6B:
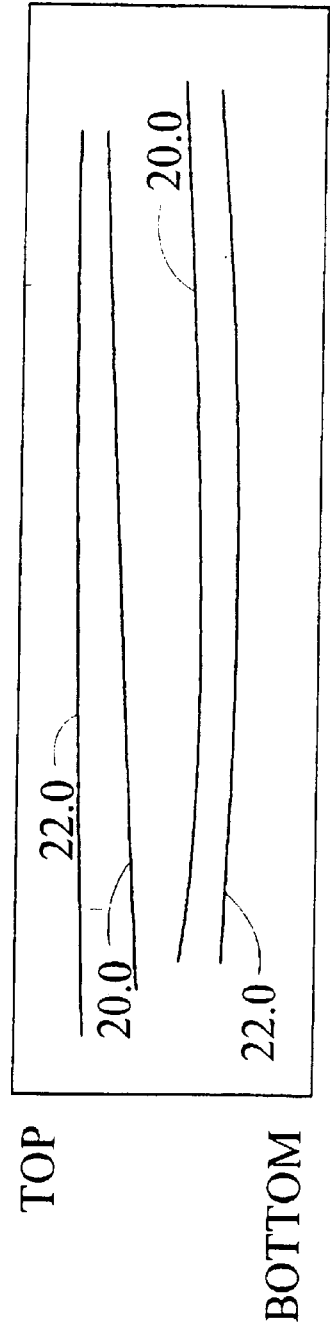
Figure 7A:
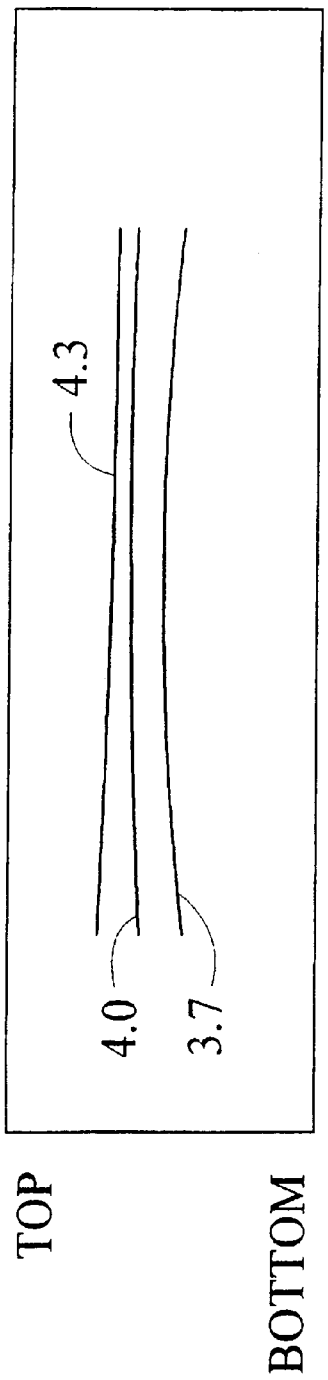
FIGS. 7A and 7B are hardness cross-sections for samples 3 and 6, respectively, of sintered bodies having a functionally gradient pore structure, made according to the invention from a broad particle size distribution ceramic powder in a colloidally unstable regime.
Figure 7B:
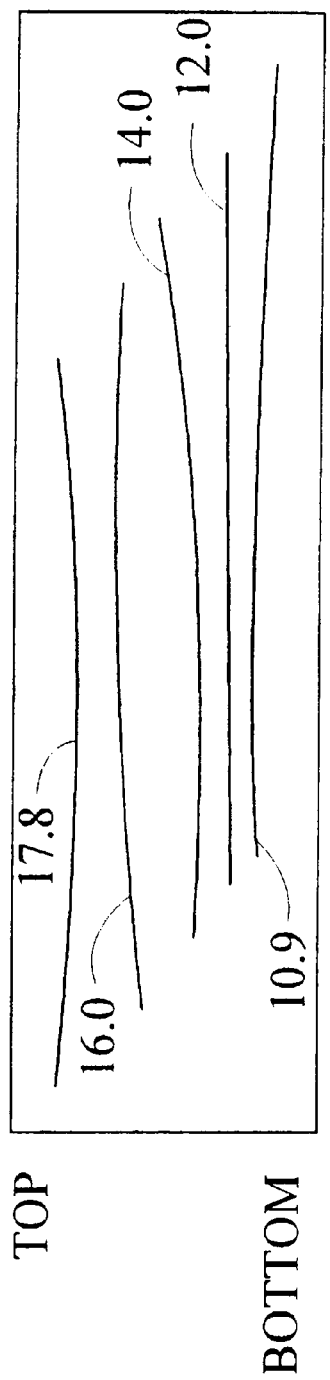

FIG. 6B shows AKP15 Alumina, prepared from 10 v/o suspension with pH=2.0, maximum sintering temp=1300° C., cross-sectional dimensions: 24.9 mm×5.0 mm. FIG. 7A shows C-84-LSB Alumina, prepared from 10 v/o suspension with pH=5.6, maximum sintering temp=1000° C., cross-sectional dimensions: 25.4 mm×5.4 mm. FIG. 7B shows C-84-LSB Alumina, prepared from 10 v/o suspension with pH=5.6, maximum sintering temp=1300° C., cross-sectional dimensions: 24.9 mm×5.0 mm.

Figure 8:
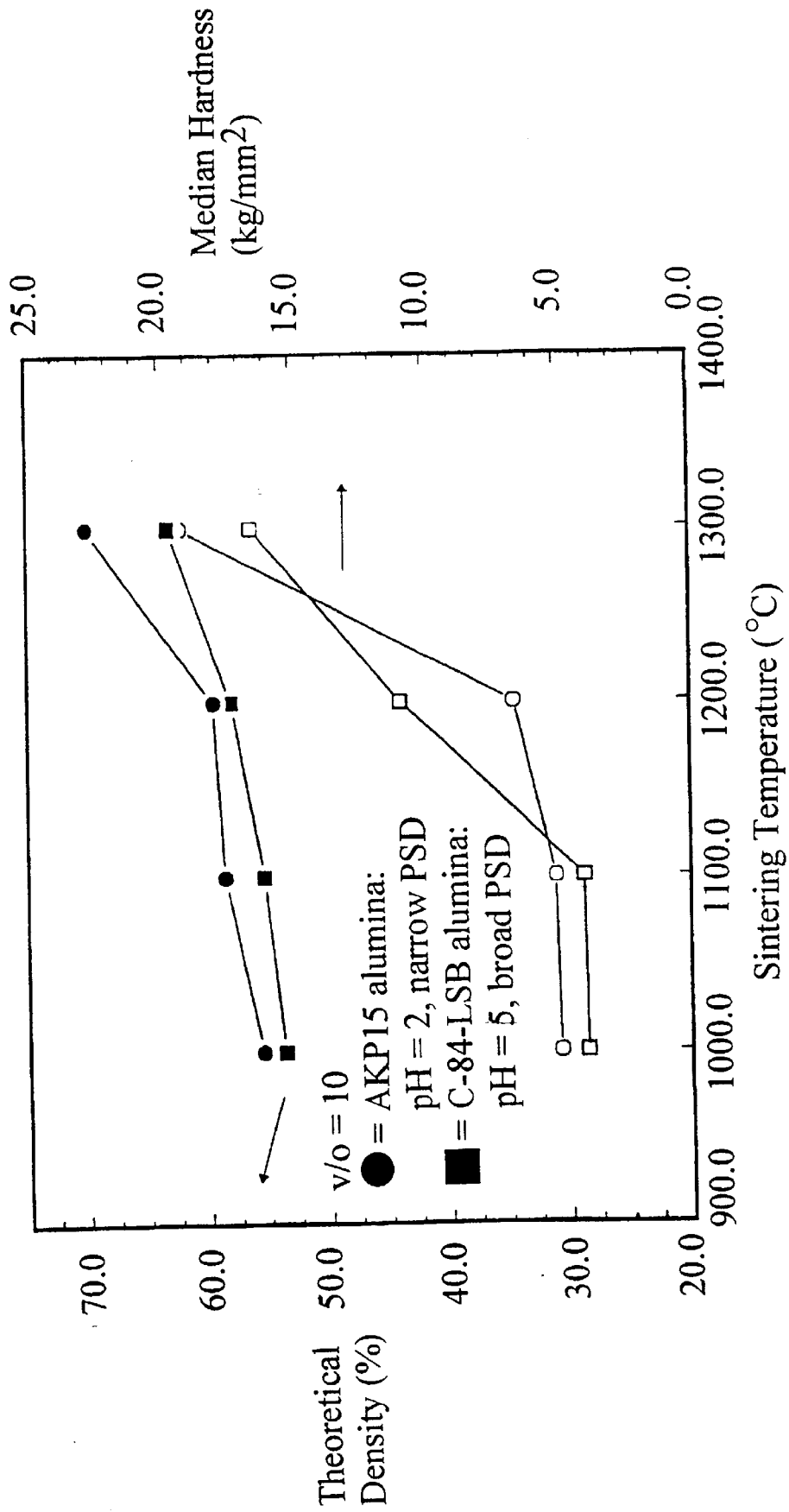
FIG. 8 is a graph illustrating Sintering temperature-Density/Hardness profiles from a v/o=10 suspension of two ceramic powder samples, according to the invention.

FIG. 8 is a graph of density (opposite of porosity) and hardness vs. temperature (of treatment) which shows that the samples harden before densifying in the broad PSD case. Metastable dispersion of fines allows "site" sintering, giving strength and hardness without too much compromise of porosity.

FIG. 8 shows that up to about 1200° C. there is not much difference in density, but the hardness of broad particle size distributed sample (BPSD) jumped significantly. (Density being the inverse of porosity, high porosity corresponds to low density. Thus, a decrease in hardness through the sample confirms the particle size gradient structure of the material.

Some additional experimental work was conducted to provide further evidence of the functionally gradient nature and the porosity properties of the ceramic membrane substrate structures according to the invention.

A two-level factorial experimental design was conducted to determine processing variables and a powder blend to optimize the properties discussed above for substrate preparation. The findings are given below:

Experimental Design

Figure 9:
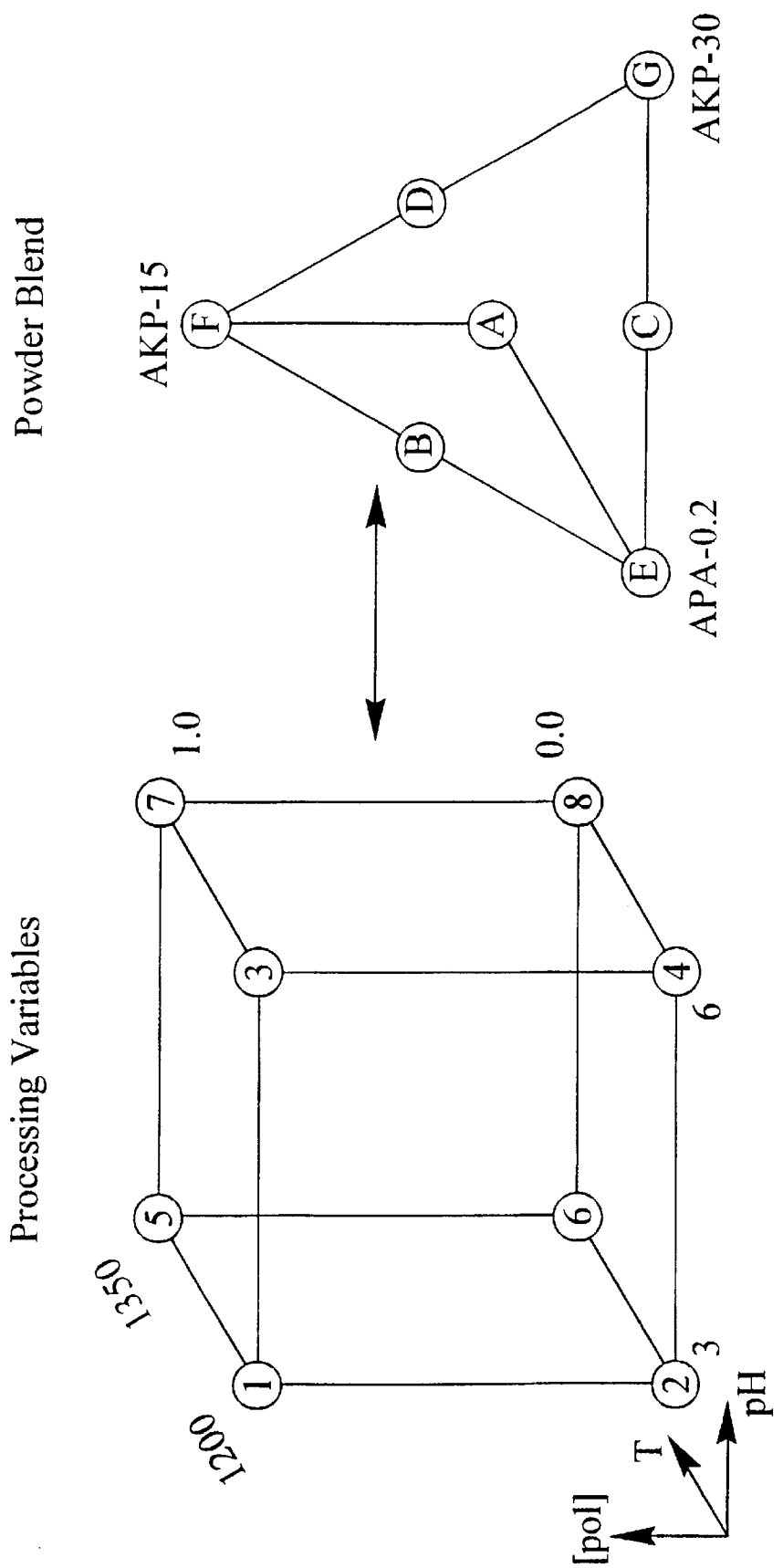
FIG. 9 is a schematic representation of a two-level experimental space with ternary powder blend system.

An experimental system with six variables was conceived. Three different alumina powders were used and their proportions varied, along with the pH, the polymer concentration and the maximum sintering temperature. A first-order two-dimensional model (equilateral triangle) design was employed to specify the proportions of powders which determined the particle size distribution. The different combination of the powders and other variables used are shown in Table 1. As there were 7 different combinations of the 3 powders (Table 1-a) and 8 different combinations of the other input variables (Table 1-b), a total of (7×8)=56 experiments had to be done. This experimental design would demonstrate any possible interactions between these independent variables. FIG. 9 shows a schematic of the experimental space.

Experimental Procedures

As determined in the initial screening study, 10 v/o suspensions were used for this microstructure analysis. Suspensions were prepared as described previously, and to the specifications give previously. The suspensions were measured for viscosity and hen slip cast as described previously to form consolidated green bodies. Sintering to form the fused microstructures was the final step.

Viscometry

A Bohlin VOR rheometer was used to obtain Theological data for the ceramic suspensions. A 13 mL sample size was used in the CP 5/30 cup and bob measuring system. For each point in the experimental space, three different suspensions were prepared and two measurements were made with each suspension. Note that the sintering temperature variable does not apply to the viscosity study, as these measurements are made before sintering. Shear stress data was obtained across a range of shear rates from $9.25 \times 10^{-3}$ to $92.5$ $s^{-1}$.

Porosimetry

To investigate the pore size distribution of the sintered ceramic structures, porosity measurements were done with a Micromeritic model 9310 pore sizer. A pore size distribution was obtained for each sample. The ceramic disc was cut into small pieces with a water-cooled diamond saw. The pieces were dried at 100° C. A porosimeter penetrometer volume of 3 mL was used.

TABLE 1

Powder blend and sample property combinations.

(a) - Powder Combinations

| Powder | APA-0.2 $f_1$ | AKP-15 $f_2$ | AKP-30 $f_3$ |
|---|---|---|---|
| A) | 0.33 | 0.33 | 0.33 |
| B) | 0.50 | 0.50 | 0.00 |
| C) | 0.50 | 0.00 | 0.50 |
| D) | 0.00 | 0.50 | 0.50 |
| E) | 1.00 | 0.00 | 0.00 |
| F) | 0.00 | 1.00 | 0.00 |
| G) | 0.00 | 0.00 | 1.00 |

(b) - Processing Variable Combinations

| Sample | pH | mg/m² NH₄⁺PMA | T[° C.] |
|---|---|---|---|
| 1 | 3 | 1.0 | 1200 |
| 2 | 3 | 0.0 | 1200 |
| 3 | 6 | 1.0 | 1200 |
| 4 | 6 | 0.0 | 1200 |
| 5 | 3 | 1.0 | 1350 |
| 6 | 3 | 0.0 | 1350 |
| 7 | 6 | 1.0 | 1350 |
| 8 | 6 | 0.0 | 1350 |

1 Factorial Model—Screening Study

A full two-level factorial design with 3 parameters, coupled with a centered ternary powder system requiring ($2^3 \times 7$) 56 simulations was used for initial screening. This is an effective way to minimize the number of simulations required to check on all possible variable interdependencies [7]. Fractional two-level designs were not considered as the assumption of insignificant high order interactions was suspect.

A number of responses were considered for analysis over the range of variables. These quantities are summarized in Table 2.

TABLE 2

Results of Two-Level Factorial Experimental Design Screening Study

| Response | Significant Terms (x/65) | Desired Extremum | Optimal Parameters | | | |
|---|---|---|---|---|---|---|
| | | | pH | mg/m² NH₄⁺PMA | T[° C.] | Powder |
| green porosity | 28/32 | MAX | 3 | 1.0 | NA | E |
| sintered porosity | 57 | MAX | 3 | 1.0 | 1200 | E |
| mean pore size ($d_{0.50}$) | 61 | MAX | 3 | 1.0 | 1200 | F |
| finest pore size ($d_{0.50}$) | 61 | MIN | 3 | 1.0 | 1200 | A |
| largest pore size ($d_{0.50}$) | 63 | MAX | 3 | 1.0 | 1200 | F |
| pore size range ($d_{0.50}$) | 64 | MAX | 3 | 1.0 | 1350 | B |

An initial examination of the responses from the 6 variable screening study yielded some insight for the selection of processing parameters for making porous ceramics.

The responses were modeled with a multivariate regression routine (IMSL:DRGLM). The general linear functional form for a response $y_i$ would be: (below, j,k,l,m,n,p=1,2,3,4,5,6) [8].

$y_i\beta_o+\beta_j x_j+\beta_{jk}x_jx_k\beta_{jkl}x_jx_kx_l+\beta_{jklm}x_jx_kx_lx_m+\beta_{jklmn}x_jx_kx_lx_mx_n+\beta_{jklmnp}x_jx_kx_lx_mx_nx_p\epsilon$ The regression analysis itself was of limited use. Looking under the "significant terms" column in Table 2, it can be seen that with a t-statistic of 2.00 (≈95% confidence interval), most of the 65 possible terms were deemed significant and retained in the model. Statistically, this showed that there was substantial interdependence of all the input variables, and that all variables were significant. Further, obvious monotonic trends did not result from the regressions, leaving analysis of the data by an overall inspection as the way to screen the variables.

Each response can be examined from the perspective of what is desirable in a functionally gradient porous membrane substrate structure. In this case, a high porosity, with a wide pore size range, yet with small finest pores, are good properties. This concept is expressed as the "desired extremum", and is listed for each response in at Table 2, along with the parameter values corresponding to this extremum. In all cases, a pH of 3 was found to be best. For a tight-skinned, yet porous structure, a small finest pore size is desired along with a large mean, largest and range of pore sizes. The metastable suspensions, at pH of 3 and electrolyte concentration of 1.0 mg/m² provided these properties. The powder blends found to have produced these favourable properties were A, B, E or F. This composition is from one side of the ternary map, shown as the shaded region in FIG. 9.

The high temperature of 1350° C. provides the largest pore size range. This widest range occurs with AKP-15 for the 1200° C. and a mix of APA-0.2 and AKP-15 for the 1350° C. experiment. Given the comparatively more mono-sized powder distribution of AKP-15, yet higher viscosity (FIGS. 10A–10C) at the sample preparation conditions, an unstable or partly flocculated green body could would be more liable to sinter with more grain growth when subjected to a higher temperature. Quantitatively, the pore size ranges from the 1200° C. sinter with powder B shows a similar magnitude, and can be expected to have a preferential functionally gradient structure.

2 Viscosity Measurement

The stress-strain data for the suspensions measured showed shear thinning or pseudoplastic behaviour.

The rheological data as it relates to the slip casting procedure is of relevance in the very low shear rate regions. That is, the particle Reynolds numbers corresponding to the sedimentation rates during slip casting are extremely low (Re≈2×10⁻⁹ for a 1 μm alumina particle), and an estimate of a zero-shear viscosity would be most meaningful in this context. There are a number of rheological models which could be physically suitable. In view of the shear thinning behaviour, appropriate rheological descriptions could come from the Bingham plastic, the Moore and/or the Cross models [9].

Bingham fluids resist a small shear stress indefinitely but flow easily under larger shear stresses with a constant viscosity. It is assumed that these fluids have a three-dimensional elastic structure, which will resist small shearing stresses but which comes apart when subjected to a stress higher than its yield strength. The Bingham plastic model incorporates a term a which represents a yield stress. Many concentrated suspensions and colloidal systems can be adequately described by the equation, $$\sigma = \sigma_\gamma + \mu_\beta \gamma$$

where $\mu_\beta$ lip is the Bingham viscosity.

The Moore model $\mu_M$ incorporates terms representing both limiting low shear rate and high shear rate viscosities. It is often able to accurately predict a material's behavior over several decades of shear rate.

$$\mu_M(\gamma) = \mu_{M\infty} + \frac{(\mu_{M_0} - \mu_{M\infty})}{(1+k\gamma)}$$

The Cross model ($\mu_c$), like the Moore model, incorporates terms representing both the limiting low shear rate and high shear rate viscosities. This model contains four independent parameters and is often able to accurately describe the shear thinning behaviour of disperse systems.

$$\mu_c(\gamma) = \mu_{c\infty} + \frac{(\mu_{c_0} - \mu_{c\infty})}{(1+k\gamma^n)}$$

Figures 10A, 10B:
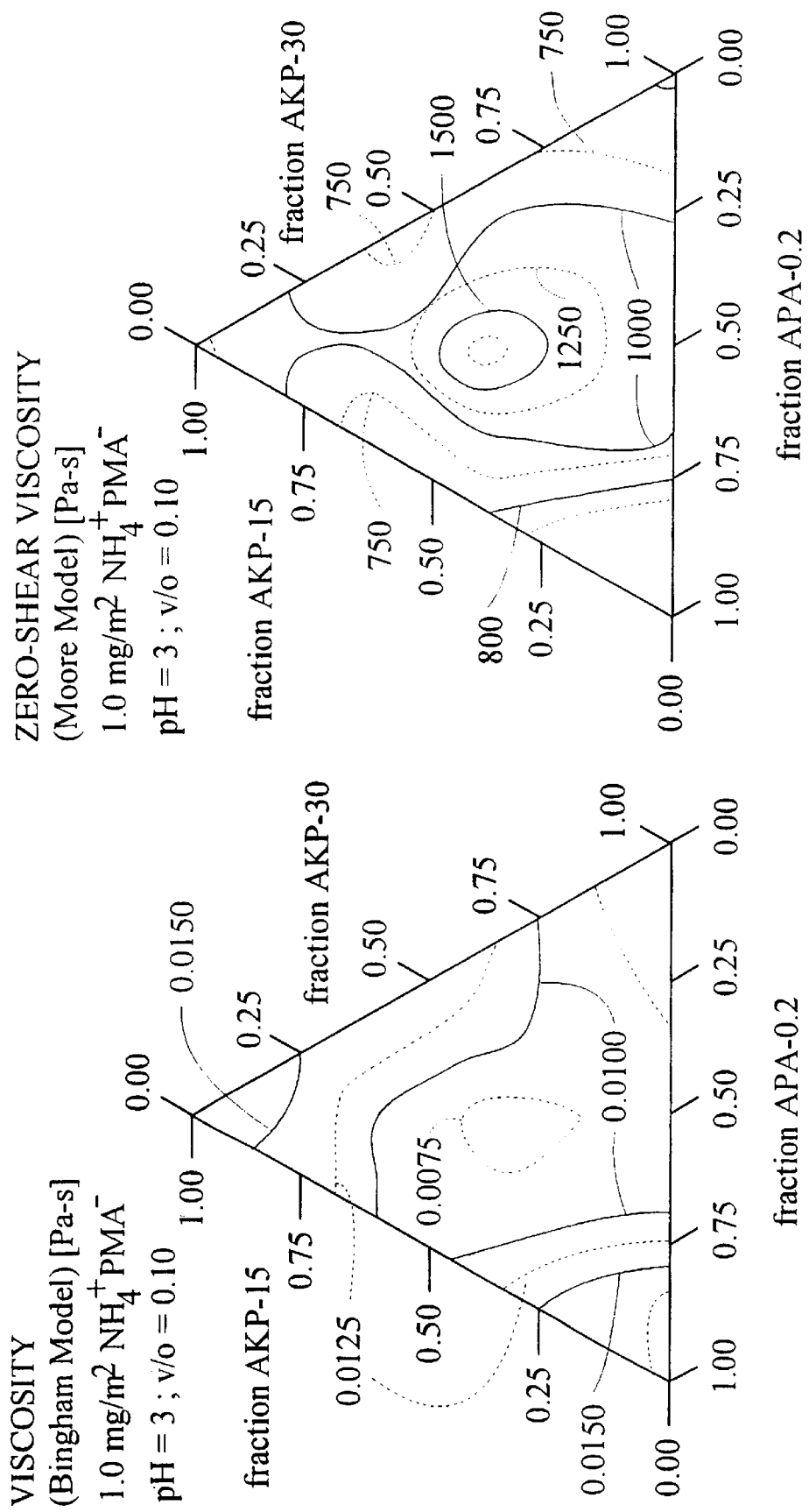
FIGS. 10A–10C is a series of ternary contours for a range of three powder blends, determined by Bingham, Moore and Cross models.
Figure 10C:
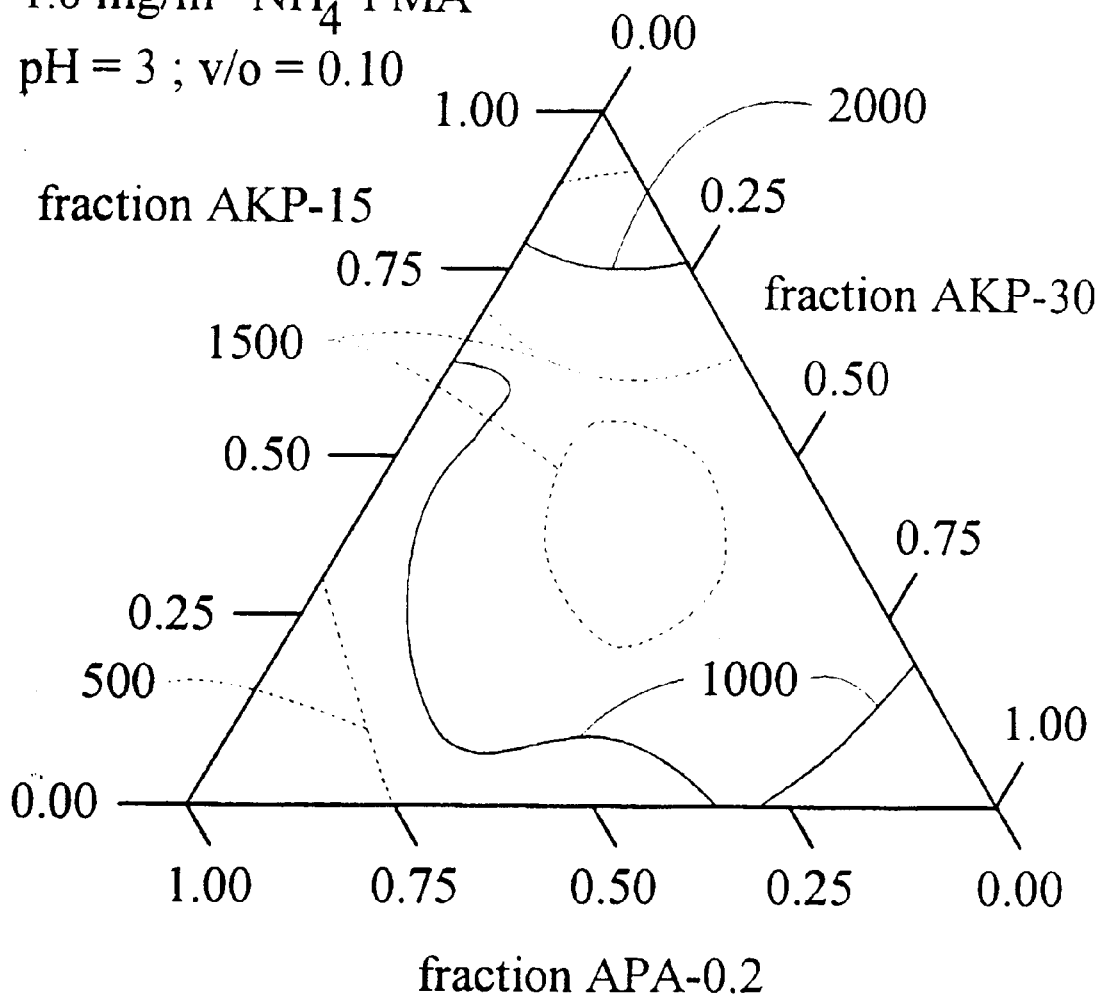

For the above models, the subscript "∞" refers to a (near) constant stress-strain ratio achieved at high shear rates, and the subscript "0" refers to a model parameter which is an estimate of the zero-shear viscosity. The zero-shear viscosities are considered to be the most relevant for the sedimentation rates in the slip casting operation. FIGS. 10A–10C shows ternary viscosity contours for the Bingham, Moore and Cross models. The Moore model could be considered to be a sub-case of the Cross model, with the shear rate exponent n, set to unity.

The Cross model was selected as the reference model, since it has the zero-shear parameter which is relevant to the slip casting process, and there is a strong visual correspondence between its powder-based ternary contours (FIGS. 10A–10C) and the ternary contours of the sintered porosity obtained under the same sample conditions (FIGS. 12A–12D). As a function of the powder blend at the sample conditions used, the Cross model viscosity varied inversely with the sintered porosity.

3 Porosity Measurement

Mercury porosimetry is based on the capillary law governing liquid penetration into small pores. A liquid that wets the wall of a narrow capillary (contact angle θ<90°) will climb up the walls of the capillary. However, the level of a liquid that does not wet the walls of a capillary (θ>90°) will be depressed. For the case of a nonwetting liquid like mercury, a pressure must be applied to cause the liquid to flow into a capillary. The relation, for the case of a non-wetting liquid and cylindrical pores is given by:

$$D = -\frac{1}{P}4\gamma\cos\theta$$

where D is the pore diameter, P is the applied pressure, γ is the liquid surface tension and θ is the contact angle. The volume of mercury V penetrating the pores is measured directly as a function of applied pressure. This D-V information serves as a unique characterization of pore structure [10].

Figure 11:
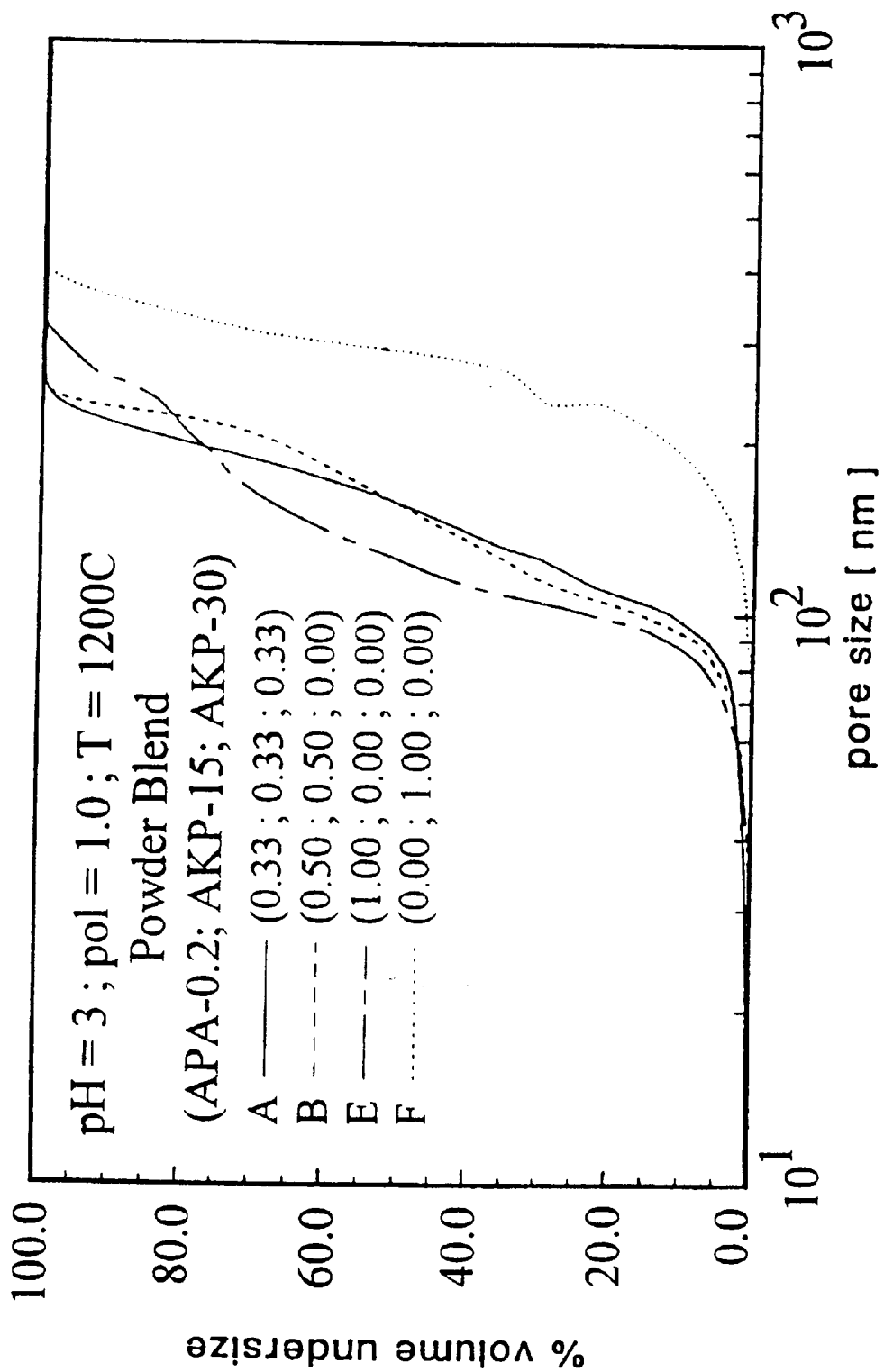
FIG. 11 is a graph illustrating cumulative pore size distributions of structures formed from various powder blends according to the invention.
Figures 12A, 12B:
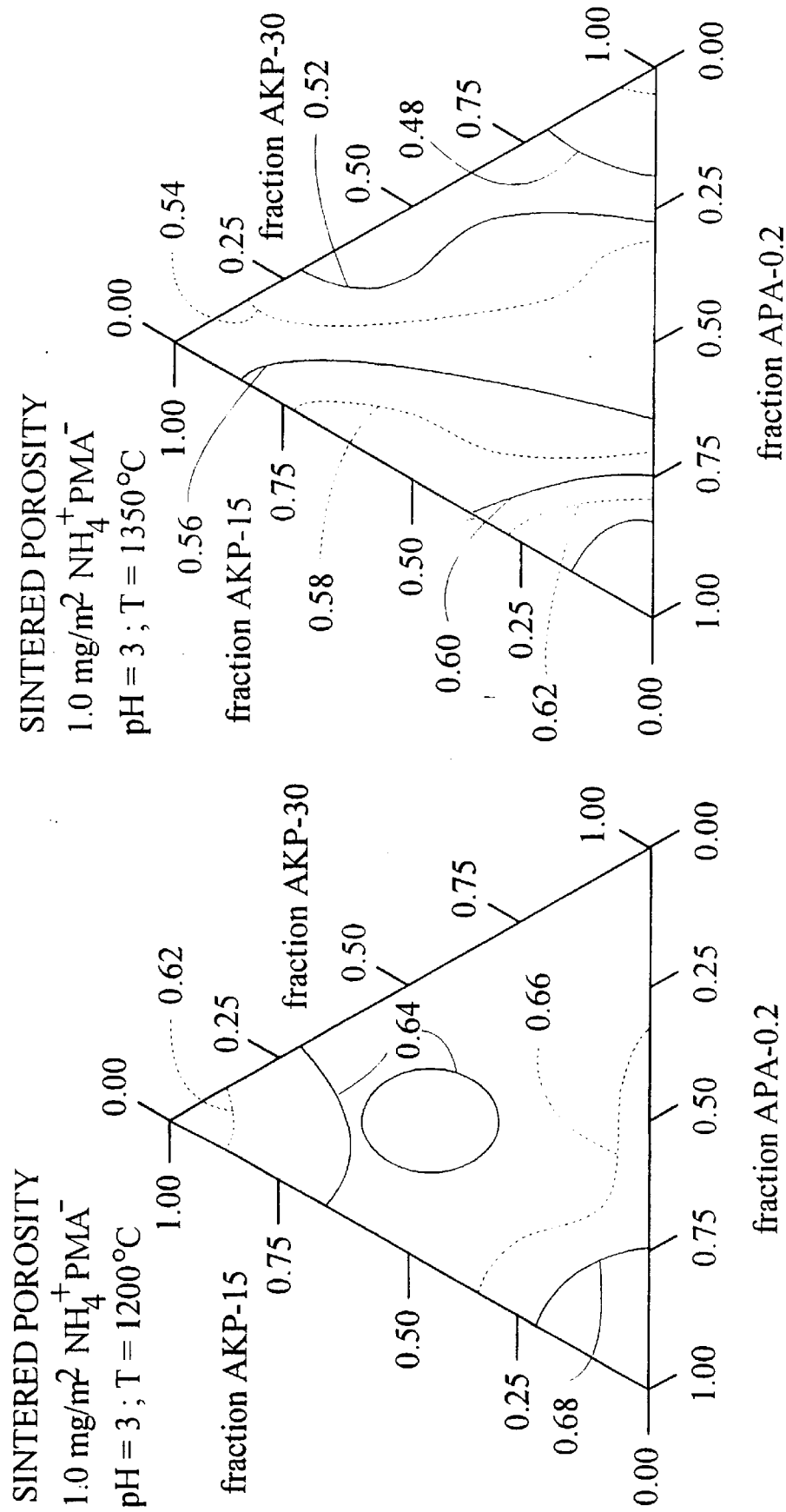
FIGS. 12A–12D is a series of ternary contours for a powder blend according to the invention, illustrating sintered porosity and pore size range over a sintering temperature range of 1200–1350° C.
Figures 12C, 12D:
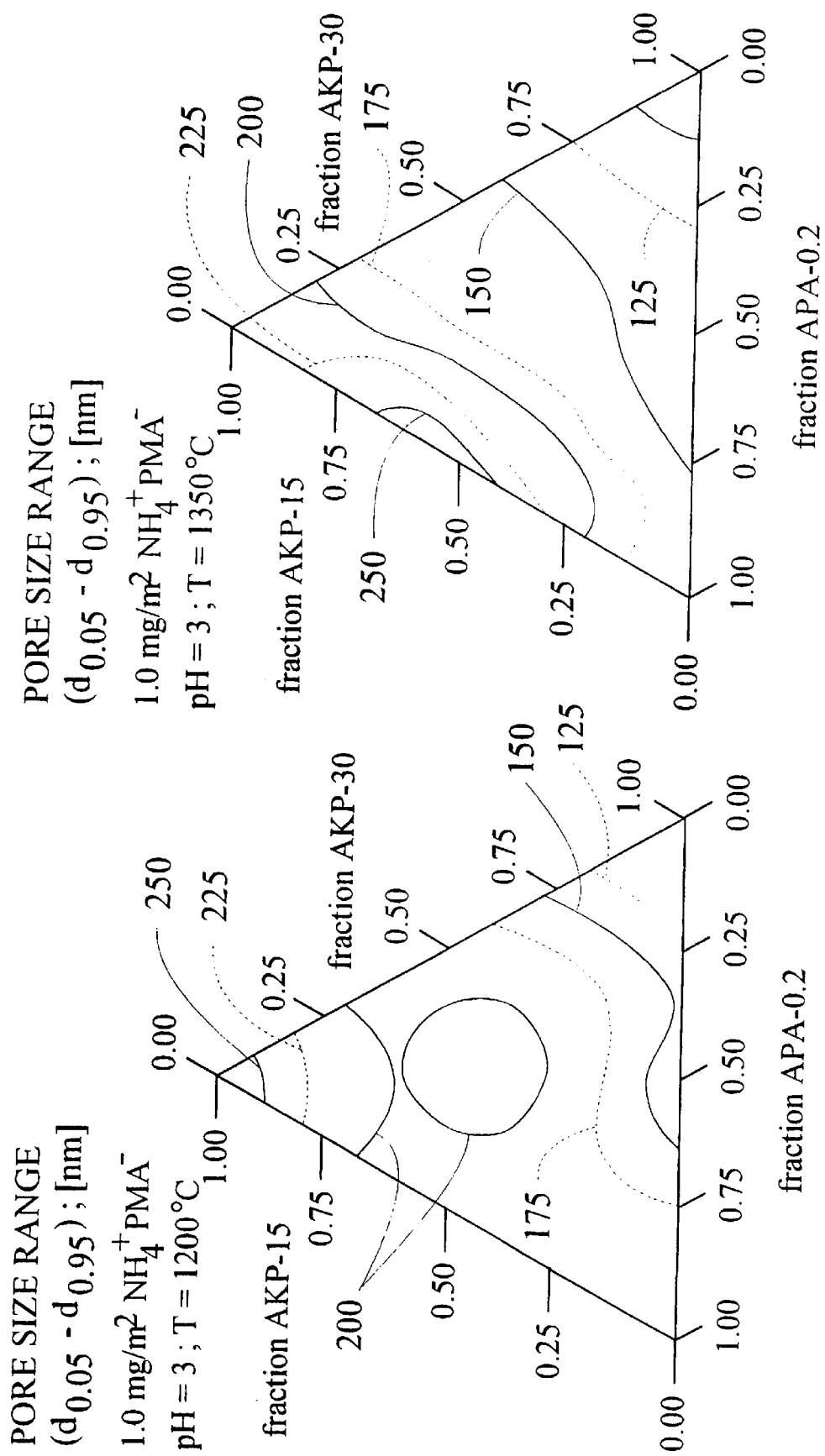
Figures 13A, 13B:
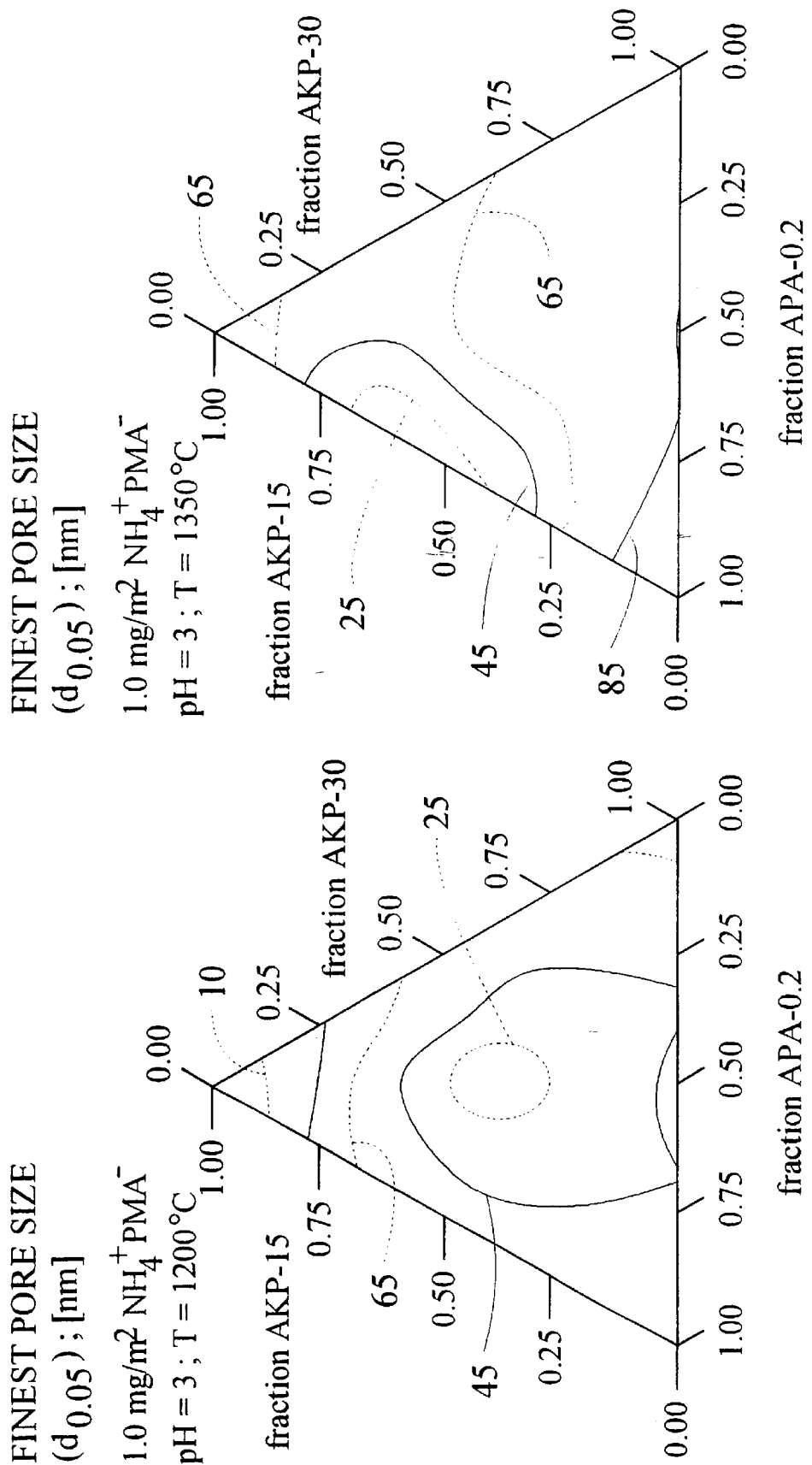
FIGS. 13A–13D is a series of ternary contours for a powder blend according to the invention, illustrating the finest and largest pore sizes over a sintering temperature range of 1200–1350° C.
Figures 13C, 13D:
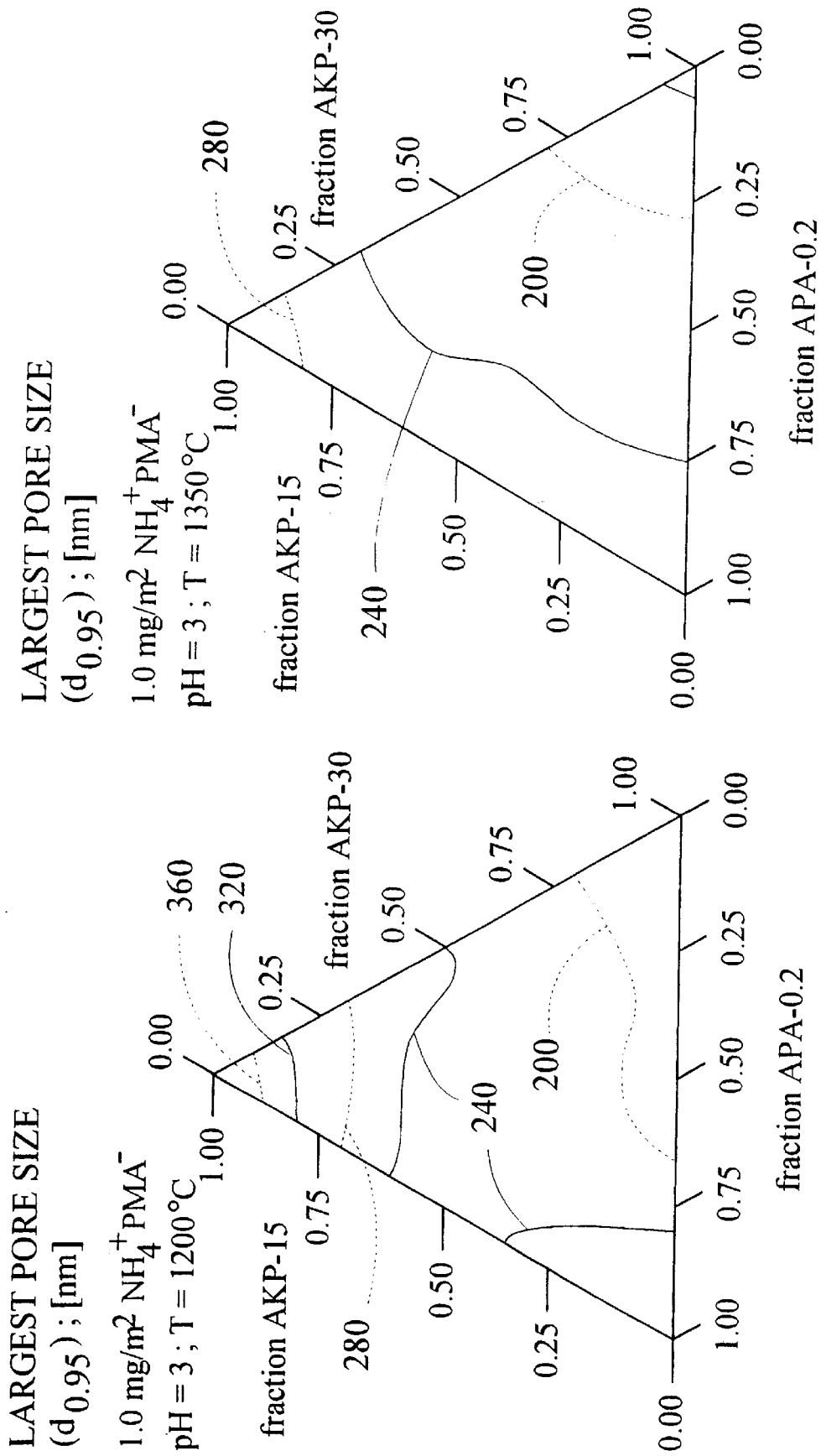

The raw porosimetric data is obtained in the form of a cumulative size distribution, as shown in FIG. 11. A more continuous pore side distribution would be reflected by a lesser slope, such as with AKP-15 or APA-0.2.

The pore size distributions however, must be considered in view of the overall porosity of the sintered structure. FIGS. 12A–12D shows the sintered porosities of the structures as a function of the ternary powder system. The pore size range, defined as the range in nm spanning 90% of the distribution area is also shown on this plot, for the 1200° C. and 1350° C. cases. In general, APA-0.2 gives the largest porosities. In FIGS. 12A–12D it can be seen that at 1200° C. the porosity remains at larger values (ie; the 0.66 contour) with blends containing some AKP-30, perhaps due to dispersion of fines throughout the powder matrix. At 1350° C., a higher porosity is favoured more in a blended state with AKP-15. At the higher temperature, the fines which contribute to local bonding may sinter to an extent which brings about more densification than a matrix containing AKP-15. The most substantial porosity loss was in the region of high AKP-30, no doubt a densification readily achieved with this finer, more uniform powder. Also in FIGS. 12A–12D, the maximum in pore size range can be seen to migrate from AKP-15 to a near 50%—50% blend of APA-0.2 and AKP-15. This could be attributed to the grain growth caused by dispersed fines at the mixed-powder 1350° C. maximum, and densification of the more uniform AKP-15 at this higher temperature. Corroboration from viscosity data (ie; reflective of suspension microstructure) shows the pore size range maximums occurring in regions of mid to high viscosity, where the packing density of the particles is not optimal.

As a check on the pore size range statistic, the finest ($d_{0.05}$) and largest ($d_{0.95}$) pore sizes were also plotted over the ternary powder range (FIGS. 13A–13D). Inspection of these contour confirms that the section bounded by powders A, B, E and F is the region with the desired asymmetric microstructure.

4 Functionally Gradient Character

Figure 14:
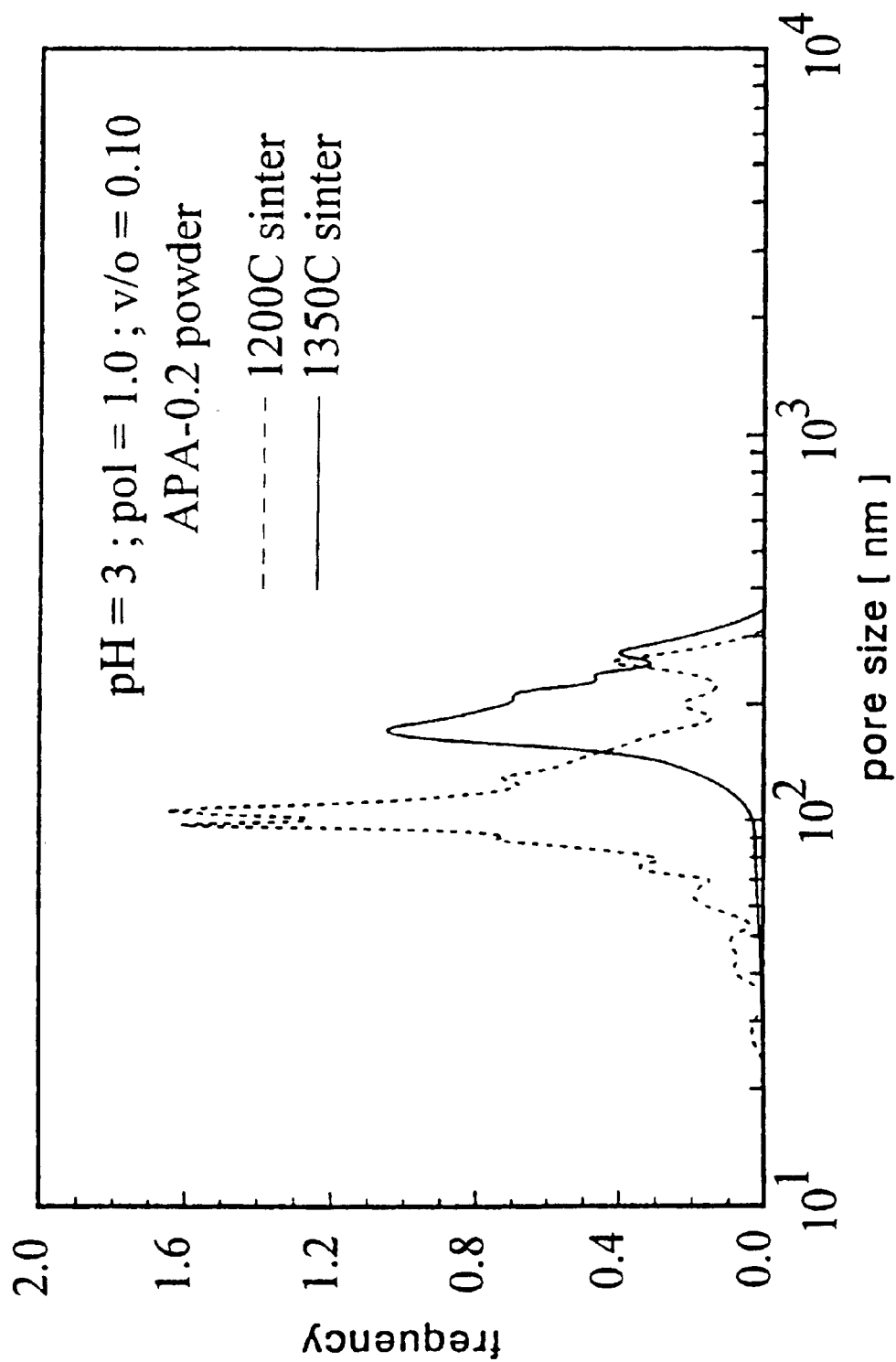
FIG. 14 is a graph which illustrates the sintering temperature effect on the frequency pore size distributions for a powder blend according to the invention.

Porosimetry was also used as a check on the functionally gradient character of the structures formed with the chosen parameters. Data used to form the cumulative distributions shown in FIG. 11, were numerically differentiated to produce frequency distributions which are shown in FIG. 14. The areas under the curve in FIG. 14 are equal, bearing in mind that the 1350° C. case appears to be smaller, but has a larger mode with the abscissae plotted on a logarithmic axis. The region of fine pores is more substantial and extends to smaller diameters (≈25 nm) for the 1200° C. case.

Figure 15:
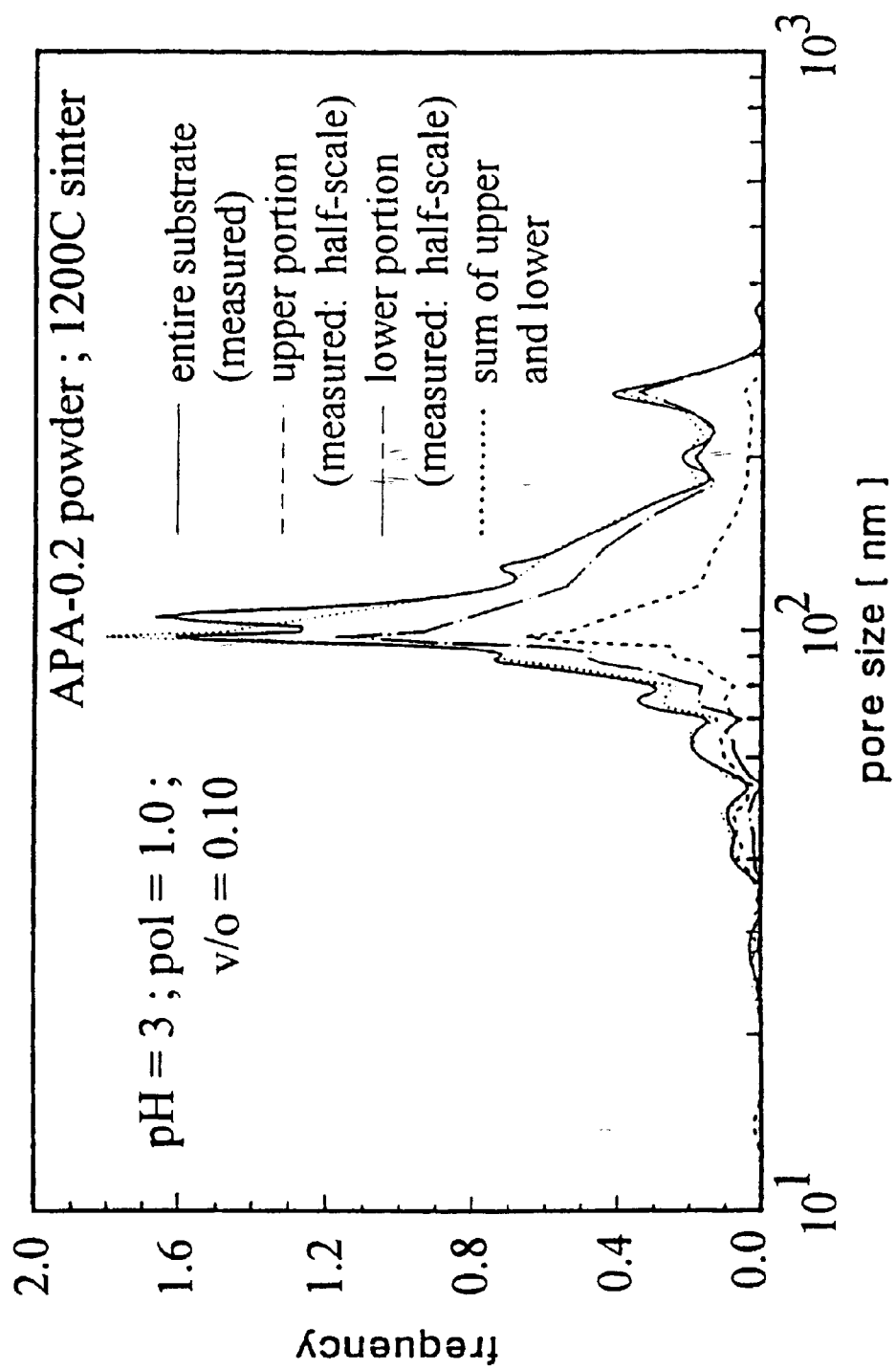
FIG. 15 is a graph which illustrates the comparison of the pore size distribution of separate upper and lower sections of a ceramic structure made with a powder blend according to the invention.

A test was conducted to verify that the presumed functionally gradient nature of these samples was confirmed by the pore size distribution measurements. Several samples were prepared under at conditions 1 and E as listed in Table 1. These samples were then ground down to roughly half thickness and measured for porosity. The pore size distributions from the upper and lower portions are shown in FIG. 15, along with the distribution obtained from measuring a sample from the entire structure. It can be seen that the upper portion corresponds to the finer tail of the overall distribution and the lower portion corresponds to the coarser distribution. The frequencies obtained for these partial distributions were normalized to give the same area as the overall distribution. These normalized frequencies were then divided by two and plotted, in order to show how they might represent the upper and lower halves of the original. The sum of the two half samples was plotted in direct comparison to the overall distribution and matches quite reasonably. It can be concluded from this illustration that the finer pores reside in the upper part of the structure and the coarser pores make up the lower part. Thus, the porous nature of these ceramic structures are functionally gradient, with an constantly increasing mean pore size, from top to bottom across the body.

References:

[1] Rigby, W. R., Cowieson, D. R., Davies, N. C. and Furneaux, R. C. An anodizing process for the production of inorganic microfiltration membranes. Trans- Inst. Metal Finish., 68(3), 1990, 95–98. See also U.S. Pat. No. 4,687,551.

[2] Ohya, H., Nakajima, H., Togami, N., Aihara, M. and Negishi, Y. Hydrogen Purification using Zirconia-Silica Composite membranes for thermochemical processes. In: Hydrogen Energy Prog. X. Proc. World Hydrogen Energy Conf., 1994, 911–920.

[3] Huang, T-C. and Chen, H-I. Permeation of gases through a supported alumina membrane. J. Chin. Inst. Chem. Eng., 26(1), 1995, 47–57.

[4] Darcovich, K., Gierer, C. and Capes, C. E. The application of dynamic clustering data to the sedimentation rates of concentrated suspensions. Adv. Powder Tech., 7(1), 1996, 1–19.

[5] Cesarano, J. (III) and Aksay, I. A. Processing of highly concentrated aqueous α-alumina suspensions stabilized with polyelectrolytes, J. Am. Ceram. Soc. 71(12), 1988, 1062–1067.

[6] U.S. Pat. No. 4,737,323, Asymmetrical Ceramic Filter, Martin, Francis J. and Morano, Jacquelline K.

[7] Himmelblau, D. M. Process Analysis by Statistical Methods, Austin, Tex.: Sterling-Swift, 1970.

[8] Darcovich K.; Dal-Cin, M. M.; Balleévre, S.; Wavelet, J-P. "CFD-Assisted Thin Channel Membrane Characterization Module Design", J. Membrane Sci., 1997, 124 (2), 181–193.

[9] Barnes, H. A.; Holbrook, S. A. "High concentration suspensions: preparation and properties", in: P. A. Shamlou\(ed.), Processing of Solid-Liquid suspensions, Oxford: Butterworth-Heinemann, ch.\8, 222–245, 1993.

[10] Reed, J. S. Principles of Ceramic Processing, 2nd Ed., New York: John Wiley & Sons, 1995.

What is claimed is:

1. A functionally gradient self-supporting porous ceramic material, comprising first and second major surfaces having a controlled substantially uniformly increasing pore size extending from the first to the second major surface, and including a distribution of ceramic fines throughout, wherein the pore size at the first major surface is in the range of 20–40 nm, and the pore size at the second major surface is in the range of 250–300 nm.

2. A material according to claim 1, wherein the ceramic material is selected from the group consisting of alumina, silica, zirconia, titania, yttria and mixture thereof.

3. A material according to claim 1, wherein the material is alumina.

4. A material according to claim 1, additionally comprising a ceramic membrane layer coated onto the first major surface, having a pore size equal to or less than that of the first major surface.

5. A method for the manufacture of a functionally gradient self-supporting material as defined in claim 1, comprising
   a) preparing an aqueous metastable colloidal suspension of a ceramic powder having a controlled broad particle size distribution, in the range of 0.1 to 10 μm,
   (b) consolidating the suspension in a mold to form a ceramic green body having a segregated particle size distribution based upon particle size, and including a distribution of ceramic lines throughout, and
   (c) sintering at temperatures to fuse without densifying the ceramic material.

6. A method according to claim 5, wherein the consolidation is effected by slip casting the suspension in a mold.

7. A method according to claim 5, wherein the sintering temperature is in the range of 1150–1350° C.

8. A method according to claim 5, wherein the controlled particle size distribution is effected by blending ceramic powders of different particle sizes.

9. A method according to claim 8, wherein the aqueous colloidal suspension includes a solids loading of 10–40 v/o.

10. A method according to claim 4, wherein the pH of the aqueous colloidal suspension is in the range of 3–6.

11. A method according to claim 10, wherein the aqueous colloidal suspension additionally comprises up to 2.0 mg/m$^2$ of a polyelectrolyte stabilizing additive.

12. A method according to claim 11, wherein the sintering temperature is about 1200° C.

13. A method according to claim 12, wherein the polyelectrolyte is $NH_4^+$ $PMA^-$ in an amount of about 1.0 mg/m$^2$.

14. A method according to claim 13, wherein the pH is about 3.

15. A method according to claim 14, wherein the solids loading is about 10 v/o.

16. A method according to claim 5, wherein the particle size distribution is in the range of 0.06 to 70 μm.

17. A method according to claim 8, wherein a blend of alumina powders APA-0.2, AKP-15 and AKP-30 is employed.

18. A method according to claim 17, wherein the particle size distribution is that defined by the shaded area ABEF in the ternary powder blend system in FIG. 9.

19. A material according to claim 4, having a porosity as determined by a ternary contour diagram of a powder blend in the range of 0.48 to 0.68.

* * * * *